Sept. 30, 1969

C. L. EMMERICH 3,470,385

OPTICAL ENCODER COMPRISING EASILY REMOVABLE CODED CYLINDER

Filed April 3, 1967

INVENTOR.
CLAUDE L. EMMERICH
BY
Constantine A. Michalos
ATTORNEY

Sept. 30, 1969   C. L. EMMERICH   3,470,385
OPTICAL ENCODER COMPRISING EASILY REMOVABLE CODED CYLINDER
Filed April 3, 1967   5 Sheets-Sheet 2

INVENTOR.
CLAUDE L. EMMERICH
BY
Constantine A. Michalos
ATTORNEY

Sept. 30, 1969     C. L. EMMERICH     3,470,385
OPTICAL ENCODER COMPRISING EASILY REMOVABLE CODED CYLINDER
Filed April 3, 1967     5 Sheets-Sheet 3

INVENTOR.
CLAUDE L. EMMERICH
BY
*Constantine A. Michalos*
ATTORNEY

INVENTOR.
CLAUDE L. EMMERICH
BY
Constantine A. Michalos
ATTORNEY

United States Patent Office 3,470,385
Patented Sept. 30, 1969

3,470,385
OPTICAL ENCODER COMPRISING EASILY REMOVABLE CODED CYLINDER
Claude L. Emmerich, Scarsdale, N.Y., assignor to Singer-General Precision Inc., a corporation of Delaware
Filed Apr. 3, 1967, Ser. No. 628,106
Int. Cl. G01d 5/34
U.S. Cl. 250—231                             8 Claims

ABSTRACT OF THE DISCLOSURE

A brushless optical encoder having an outer lamp-carrying cylinder; an inner photoconductor-carrying cylinder; and an intermediate mask-carrying cylinder. Both the photoconductor cylinder and mask cylinder are arranged in a combination providing a predetermined code. The outer cylinder, being fixed, is covered with electroluminescent material. The inner cylinder includes a photosensor extending along the outside of the cylinder. The inner cylinder is mounted in such a manner that the electroluminescent material illuminates all the photosensors set in their array. The intermediate middle cylinder or drum comprises a thin opaque mask for controlling the light directed from the outer lamp-carrying cylinder to the inner photoconductor-carrying cylinder in accordance with predetermined coded information.

BACKGROUND OF THE INVENTION

Field of the invention

This invention relates generally to optical systems, and particularly to an optical shaft angle encoder requiring no lense systems.

Description of the prior art

Heretofore, it has been the practice to use optical encoders utilizing filament lamps, or lenses having limited interchangeability and requiring precise alignment. There was presented a problem in interchanging and testing the alignment of the component parts of the encoder.

SUMMARY OF THE INVENTION

In the present optical encoder, there are provided three concentric cylinders, an outer, an inner, and an intermediate cylinder or drum. The outer cylinder is fixed, carrying electromuinescent material on its inner diameter. If the outer cylinder is made of transparent material, such as glass, it can carry the electroluminescent material on its outer diameter.

The inner cylinder is used for carrying an array of photoconductors or photosensors on its outer diameter. This inner cylinder is also fixed, mounted in such a manner in relation to the outer cylinder that the electroluminescent material of the outer cylinder illuminates all the photosensors set in their array.

The third or middle cylinder, which is usually called the drum, comprises a thin, black, opaque shell which is freely supported on a rotatable shaft between the fixed outer cylinder and the fixed inner cylinder. The drum is rigidly attached to the shaft so that it rotates with it by means such as a motor.

A large number of very small holes are etched through the drum such that light is transmitted from the outer electroluminescent cylinder to the inner photoconductor cylinder in a predetermined pattern, which rotates with the shaft. The drum is removable so that a variety of patterns can be utilized.

In addition, the three concentric cylinders are so designed that the stationary inner cylinder provides space within its inner portion to house a number of micro-circuit amplifiers that amplify the photosensor signals to a level useful in computer logic, as hereinafter more fully described.

DESCRIPTION OF THE PREFERRED EMBODIMENT

Figure 1:
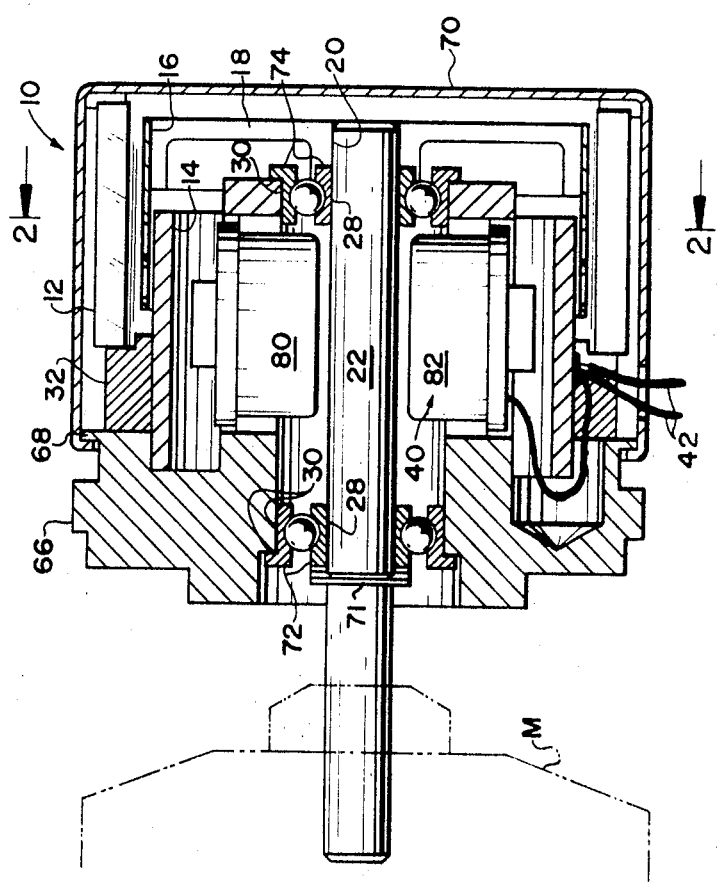
FIGURE 1 is a sectional side view of a preferred means of aligning and securing the three concentric cylinders in accordance with a preferred embodiment of the invention.
Figure 2:
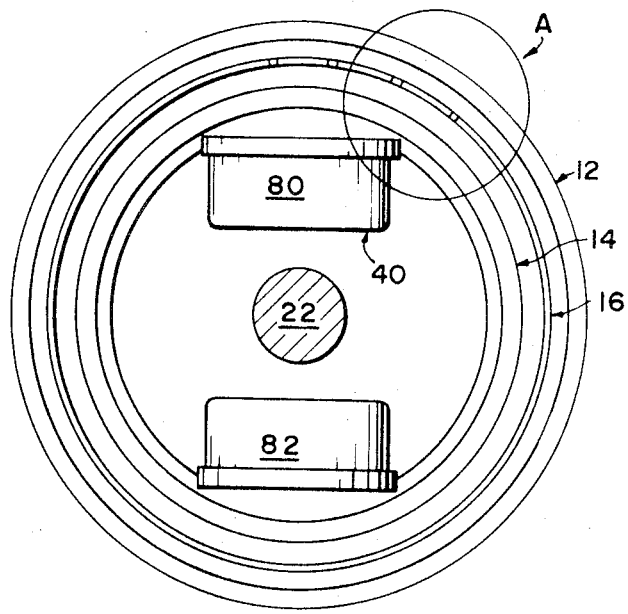
FIGURE 2 is an end view of the invention showing the amplifiers and the drum interposed between the outer electroluminescent-carrying cylinder and the inner photoconductor-carrying cylinder taken substantially along line 2—2 of FIGURE 1.
Figure 3:
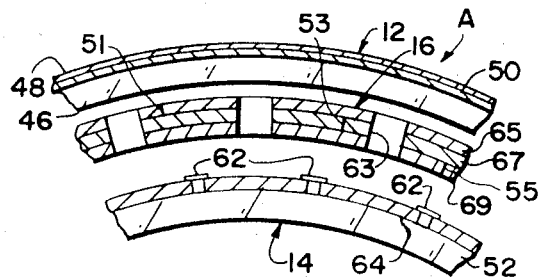
FIGURE 3 is an enlarged fragmentary sectional view of the area enclosed in the circle A of FIGURE 2, showing a detail of the three cylinders in accordance with the preferred embodiment of the invention.

Referring to FIGURES 1, 2, and 3 of the drawing in detail, the embodiment of this invention primarily provides for a brushless optical encoder 10 with a means employed to optically interconnect three concentric cylinders, two of which are stationary and one rotatably moveable therebetween. The stationary cylinders are comprised of an outer lamp or electroluminescent-carrying cylinder 12 and an inner photoconductor-carrying cylinder 14. Interposed between said outer and inner cylinders 12 and 14, is a rotatable coded intermediate drum or mask-carrying cylinder 16 having a predetermined pattern of apertures 63.

To provide for an accurately assembled unit, a drum support 18 having a close tolerance bore 20 which in turn is supported by a shaft 22, supporting a pair of axially-spaced bearings 72 and 74 having internal and external bearing bores 28 and 30 respectively for maintaining the inner cylinder 14 which is rigidly attached to a supporting structure 66 in highly accurate concentric alignment in relation to the mask-carrying cylinder 16. In order to preserve the spacing between the drum 16 and the outer cylinder 12, a hub 32, attached to the inner cylinder 14, supports the outer cylinder 12.

To provide for quick interchangeability of the coded portion of the encoder or the mask-carrying drum 16, both the inner cylinder 14 and outer cylinder 12 are supported at one end of the encoder 10 by the supporting structure 66, as best shown in FIGURE 1. In the overall preservation of the interchangeability of the coded drum 16, a snap ring 71 is provided to permit removal of the subassembly comprising the shaft 22, drum support 18, and drum 16. It should be noted that the unique arrangement of the assembly permits the support and shielding of an electric circuitry 40 within the inner cylinder 14 with access to external systems through electric conduits 42. The through shaft 22 permits ganging of a geared-down low-speed brush or optical encoder for additional bits, not shown.

Referring more specifically to FIGURES 2 and 3, the electric circuitry 40 is shown supported within the inner cylinder 14 producing a more compact unit. In addition, FIGURES 2 and 3 show the outer electroluminescent cylinder 12 which primarily comprises a transparent material 46 which is coated on the entire outer surface with electroluminescent material 48. The cylinder 12 may be of opaque material and the electroluminescent material placed on its inner surface. Interposed between the transparent material 46 and the electroluminescent material 48 can be placed a phosphor with long persistence component 50 which may be of the type having the trademark of Radelin having a chemical formula ZnSCdS:Cu made by U.S. Radium Corporation of Morristown, N.J. Another system may be used in which the phosphor herein just described can be mixed in with the electroluminescent material and coated on the outer cylinder 12. That is, the encoder, using ordinary electroluminescent materials may not function properly because of light modulation at the excitation frequency. This disadvantage may, therefore, be overcome by mixing fluorescent phosphors in with the electroluminescent material to extend the light emission time over the dark periods in the electroluminescent source, thereby providing essentially a steady source of illumination. Further, the electroluminescent material or the combination of the electroluminescent material with this phosphor may be coated on the inside of the outer cylinder 12 and therefore provide for a closer contact with the other two cylinders and at the same time, any material can be used, transparent or non-transparent, for the fabrication of the outer cylinder 12.

Figure 4:
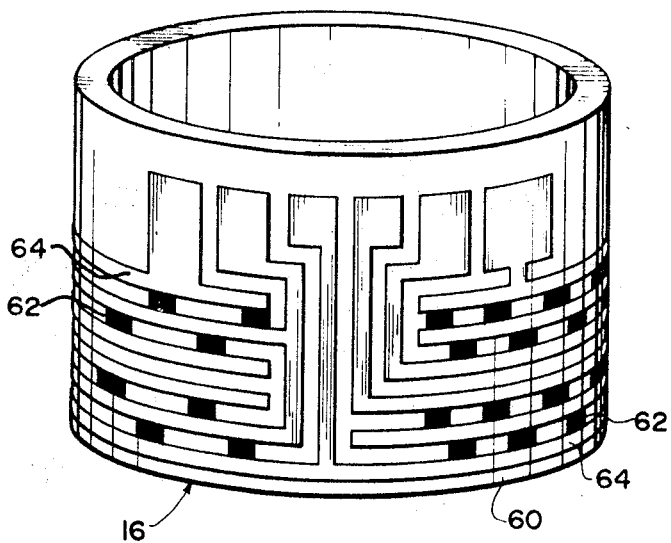
FIGURE 4 is a view somewhat in perspective of the inner photoconductor-carrying cylinder.
Figure 5:
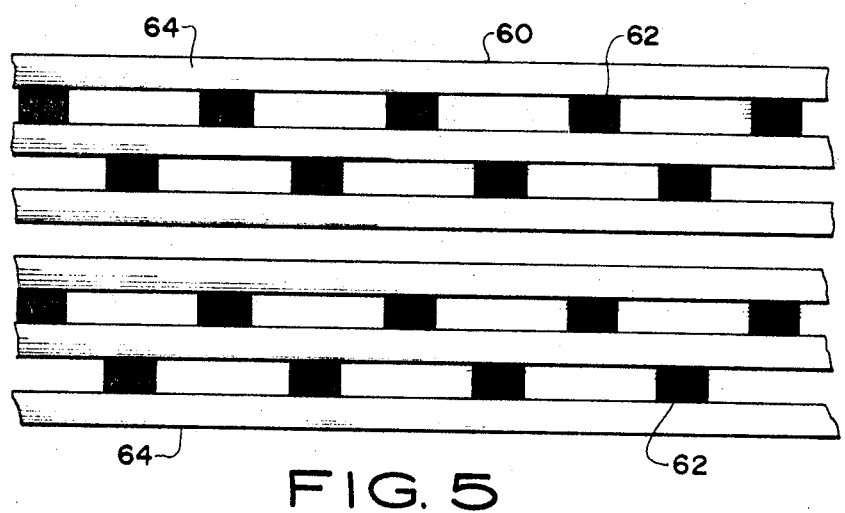
FIGURE 5 is a flat view of a segment of the inner photoconductor-carrying cylinder. It shows the array of photosensors and conductors interconnecting the photosensors for completing the electrical connections.

The inner cylinder 14 may be constructed of a glass or ceramic material 52 which need not be transparent, since it can support the photoconductor material on its outer periphery as it is much easier to coat a cylinder on the outside surface rather than on the inside surface. As more specifically shown in FIGURES 3, 4, and 5, the cylinder 14, having the ceramic substrate 52, is coated with gold electrodes 64, and photoconductor material 62 in a pattern 60 that is more specifically shown in FIGURE 4.

The rotatable intermediate mask-carrying cylinder or drum 16 is a low inertia thin cylinder fabricated for high rate of rotation. As shown in FIGURE 3, the drum is perforated with a series of the holes 63, evenly spaced around its periphery. These holes 63 provide for the selective illumination of the photosensor pattern 60 on the inner cylinder 14 by the electroluminescent light source 48 on the outer cylinder 12 as the shaft 22 is rotated. The drum 16 can be assembled from a plurality of separately perforated thin sheets 65, 67, 69 which are rolled into cylindrical shape and bonded along seams 51, 53, and 55, each seam being staggered circumferentially about the cylinder.

As shown in FIGURE 1, the system is aligned and secured within the supporting structure 66. The support structure 66 has outwardly extending portions 68 disposed for connecting a cylinder cover 70 disposed at one end of the shaft 22 axially opposite to a drive motor M. At a middle portion of the shaft, there is provided the pair of supporting bearing assemblies 72 and 74. The bearing assemblies 72 and 74 in turn support the drum 16 through a mask support 18. The mask support 18 is very accurately machined so that the plane of the support 18 is 90° to the axis of the shaft 22. Therefore, the bearing assemblies 72 and 74 locate the shaft 22 so that the shaft 22 with the support 18 is concentrically in line with the inner structurally supported cylinder 14. That is, a dial indicator may be used on the periphery of the drum 16 so as to show substantially zero run-out. The same shaft assembly, after alignment and attachment to the drum 16, can be used for supporting other drums having different coded information as may be desired.

Figure 6:
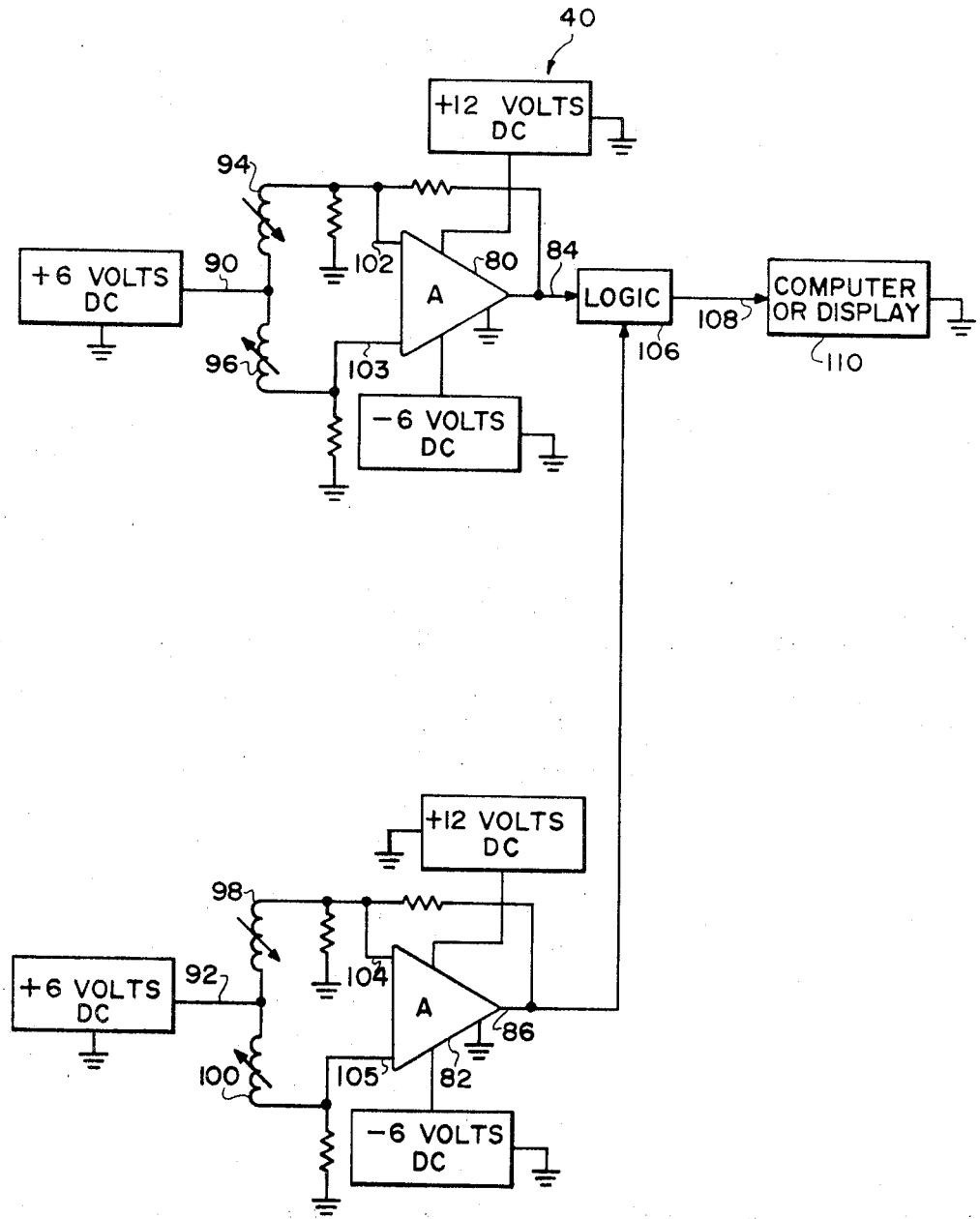
FIGURE 6 is the electrical circuitry of the system in accordance with the preferred embodiment of this invention; and, FIGURE 7 is an enlarged schematic diagram showing the actual sensed voltage signals produced by the system.

As shown in FIGURES 1 and 2, within the inner cylinder 14, is supported the circuitry of FIGURE 6, comprising a pair of high-speed amplifiers 80 and 82 such as the type uA710, manufactured by Fairchild Semiconductors, Inc. These amplifiers have a response time of approximately forty nanoseconds, which is an advantage of the optical encoder over the conventional brush or pin types.

Figure 7:
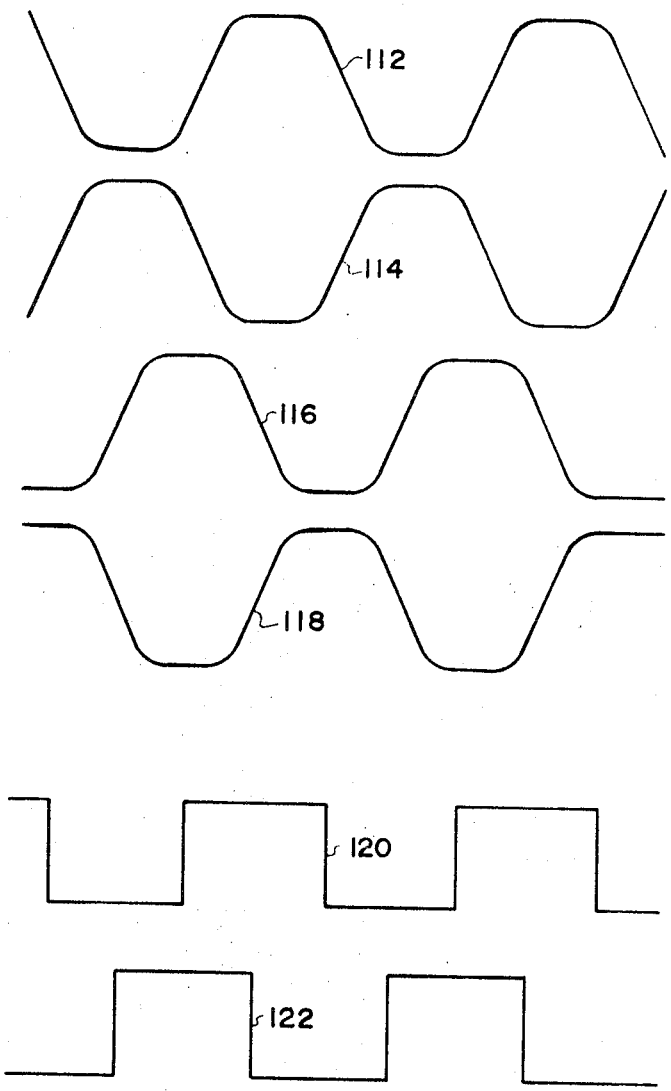

As more specifically shown in FIGURE 6, the electrical circuitry, comprised of a pair of the uA710 amplifiers 80 and 82, direct output signals to line conductors 84 and 86 respectively. Feeding the amplifiers 80 and 82 are voltage signals received from the electroluminescent light through the mask 16 to the sensors 62. More specifically, the light signals cause the photosensors' resistances to vary as indicated by the variable resistors, 94, 96, 98 and 100 respectively. The voltage supplied through lines 90 and 92 to the photosensors is thereby selective channeled to the amplifiers 80 and 82 via lines 102, 103, 104 and 105 respectively. One signal is then directed through the output line conductor 84 to a logic 106 which in turn is directed through line conductor 108 to a computer or display means 110. The second signal is directed through the output line 86 to the logic 106 and then again to the computer or display 110 through the line conductor 108. The display 110 then produces a signal as shown by the graphs of FIGURE 7 wherein the first two graph curves 112 and 114 present the signal as it is received as a voltage at the amplifier 80, and the graph curves 116 and 118 is the voltage received at the amplifier 82. The amplifiers 80 and 82 then square off the signal into an output as shown by graph curve 120 for the amplifier 80 and graph curve 122 for the amplifier 82.

In summary therefore, this invention provides for features wherein high-speed photosensors and amplifiers are used to allow very rapid motion of the encoder. Rapid motion is an advantage of an optical encoder over the conventional brush or pin-types. In addition, this invention provides for means that avoid the use of rubbing parts which result in extremely low friction and low wear. As shown, the encoder herein provides for a through shaft permitting ganging to a geared-down low speed optical encoder, thereby permitting additional bits of information to be included. In addition, the encoder has low inertia, because the active rotating element is a very thin drum, as hereinbefore described. The drum also shields the photosensors from external electrical fields. Further, as described, the encoder is designed to use two identical ball bearings for support, and in addition, it can maintain alignment of the bearing bores by requiring concentricity specification on only one diameter in addition to the bearing bores.

In all respects, the encoder is designed to have the outer cylinder fastened to the inner cylinder permanently while having the intermediate cylinder interposed therebetween with the motor at one end of the shaft and the coded drum at the outer end of the shaft for easy assembly and disassembly of the coded information.

While the present invention has been described in a preferred embodiment, it will be obvious to those skilled in the art that various modifications can be made therein within the scope of the invention, and it is intended that the appended claims cover all such modifications.

What is claimed is:

1. In an optical encoder having an outer cylinder carrying electroluminescent material thereon, an inner photoconductor-carrying cylinder, concentric with said outer cylinder, fastening means for subassembling said two cylinders for quick removal and thereby testing as a separate unit before assemblage of said two cylinders, and a coded mask-carrying cylinder interposed between said outer cylinder and said inner cylinder for controlling the light directed from the outer cylinder to the inner photoconductor cylinder in accordance with predetermined code information, the improvement therein, comprising in combination: a shaft, with a pair of axially spaced bearings interposed between said shaft and the subassembly of said outer and inner cylinders for said subassembly maintaining said shaft in concentric position with said inner and outer cylinders, having bearing bores coaxially aligning and operably maintaining alignment of the mask-carrying cylinder with the subassembly of said outer and inner cylinders for maintaining a required concentricity specification on only one diameter in addition to said bearing bores.

2. In an optical encoder having an outer cylinder carrying electroluminescent material thereon, an inner photoconductor-carrying cylinder, concentric with said outer cylinder, fastening means for subassembling said two cylinders for quick removal and thereby testing as a separate unit before assemblage of said two cylinders, and a coded mask-carrying cylinder interposed between said outer cylinder and said inner cylinder for controlling the light directed from the outer cylinder to the inner photoconductor cylinder in accordance with predetermined coded information, the improvement therein, comprising in combination: a shaft, concentric with, and radially spaced from said inner cylinder; a pair of axially spaced bearings interposed between said shaft and the assemblage of said outer and said inner cylinders for maintaining said cylinders in concentric position with said mask-carrying cylinder; bearing bores operably maintaining alignment of the mask-carrying cylinder with such assembly; and electric means wherein the components of said electric means are operably supported by said inner cylinder within the space provided between said shaft and said inner cylinder thereby compacting said electric means within the overall configuration of the encoder.

3. The structure of claim 2, wherein said bearings are of identical configuration for supporting said outer and inner cylinder subassembly in high efficient concentric position with said mask-carrying cylinder.

4. The structure of claim 2, wherein the three cylinders are radially spaced from each other resulting in no rubbing parts and thereby resulting in extremely low friction and low wear on the overall system.

5. The structure of claim 2, wherein said mask-carrying cylinder comprises three superimposed thin metallic cylinders, said metallic cylinders connected at a seam along an edge, each seam being staggered circumferentially about said cylinders for producing a single thin mask-carrying cylinder having operable shielding effects for shielding the photoconductors from any electrical field set up by said electroluminescent source produced by the electroluminescent-carrying cylinder.

6. The structure of claim 2, wherein said shaft is located through said encoder for supporting said two bearings, a motor operably connected at one location axially from said bearings whereby the through shaft and said motor arrangement permits ganging to a geared-down low speed or optical encoder for operably permitting additional bits of information on the same size cylinder configuration.

7. The structure of claim 2, wherein said shaft comprises two ends and an extending portion therebetween for supporting the bearings at the extending portion within said encoder and further comprising a motor on one end of said shaft axially spaced from said bearings and said drum operably located on the other end of said shaft axially spaced from said bearings in both radial and axial direction and thereby assuming quick assemblage and disassemblage of the coded mask-carrying cylinder without disrupting the alignment of said motor and the subassembly of said inner and outer cylinder from the overall encoder.

8. The structure of claim 7, further comprising supporting means supporting the assembly of said inner and said outer cylinders, said supporting means having radially outwardly extending flanges and a cover means operably supported on the shaft end supporting said mask-carrying cylinder for operably maintaining said encoder in a clean status while being easily detachable for quickly removing said mask-carrying cylinder for replacement with another mask-carrying cylinder having different coded information thereon.

References Cited
UNITED STATES PATENTS

| | | | |
|---|---|---|---|
| 2,921,204 | 1/1960 | Hastings et al. | 250—219 |
| 3,097,302 | 7/1963 | Wayne et al. | 250—231 X |
| 3,111,841 | 11/1963 | Gray | 250—231 X |
| 3,165,634 | 1/1965 | Raymond | 250—213 X |
| 3,194,967 | 7/1965 | Maysh | 250—211 |
| 3,258,601 | 6/1966 | Suleski | 250—211 |

WALTER STOLWEIN, Primary Examiner

U.S. Cl. X.R.

250—219; 340—271